Patented Mar. 23, 1943

2,314,701

UNITED STATES PATENT OFFICE 2,314,701

LAMINATED PRODUCT

Mortimer T. Harvey, East Orange, N. J., assignor to The Harvel Corporation, a corporation of New Jersey No Drawing. Application November 15, 1938, Serial No. 240,496

2 Claims. (Cl. 154—43)

The present invention relates generally to laminated material in which sheets or strips of fibrous material are bound together by a phenol-aldehyde type of condensation product and the methods and steps of making and using said laminated material.

Binders of the phenol-aldehyde type of condensation product have been used for a long time in making laminated material, but certain difficulties and disadvantages in the manufacture thereof or in the use thereof have appeared and it is an object of the present invention to provide a product and methods and steps for making and using the product which avoid such difficulties and disadvantages.

One of the particular objects of the present invention is that of providing an intermediate product in which sheets or strips of fibrous material are cemented together by a potentially reactive condensation product which will wet the surfaces of fibrous material sufficiently to cement them together, which potentially reactive condensation product has sufficient body to hold it from flowing from and leaving the surface of and passing into the pores or interstices of fibrous material, particularly when pressure and heat are applied, and yet is soluble in a thinner such as alcohol, benzol or alcohol or mixtures thereof.

Another object of the present invention is to provide a laminated material in which holes or notches can be punched at a high rate of speed at normal temperatures (without heating) without delamination. An advantage obtained by the achievement of this object is that the condensation product can be given its ultimate or other predetermined set or degree of condensation at the time the laminated material is cured to carry the potentially reactive cementitious condensation product to a solid state. Another advantage is that the necessity for heating of the laminated material to prevent delamination during punching is obviated.

Another advantage of the present invention is that good, clean edges are left at the punched holes or notches, free of threads or shreds.

Another object and advantage of the present invention is a laminated material which has high electrical insulating values for direct current or for alternating currents of from the low to the extremely high frequencies, known as radio frequencies.

Examples of the fibrous materials suitable for use in the practice of the present invention are paper, blotting board, card board and similar so-called boards, cloth or textile fabric such as cotton, muslin, duck, canvas and others commonly used and cloth or fabric woven or otherwise made of asbestos or glass threads.

The condensation product used in the practice of the present invention are obtained by condensing a reactive methylene group containing material and two kinds of phenols, first, a phenol such as carbolic acid, the cresols and the xylenols and second, a phenol having on the nucleus thereof an unsaturated open chain hydrocarbon substituent such as cashew nut shell liquid, cardanol, marking nut shell liquid, urushiol, butadienyl phenol and para allyl phenol, all of which latter are or contain phenols of the specified type having at least two of the readily reactive positions unsubstituted. Condensations reactions of an aldehyde (or reactive methylene group containing material) with a phenol containing an unsaturated open chain hydrocarbon substituent and having at least two of the readily reactive positions unsubstituted, with or without co-condensation of an aldehyde with a phenol such as carbolic acid, the cresols and the xylenols, have been known for some time as disclosed in my Patent Numbers 1,725,797 of August 27, 1929, and 1,821,095 of September 1, 1935, and the use of cashew nut shell liquid-aldehyde condensation for making impregnated fabrics for use in electrical insulation is described in my Patent 1,725,791 of August 27, 1929, but the present invention brings out improvements for the making of punched laminations at a high rate of speed which involves a combination of physical requirements which are obtained by the methods of this invention.

Formaldehyde is used as a specific example for illustrative purposes herein but other reactive methylene group containing materials such as hexamethylene tetramine, paraformaldehyde, furfuraldehyde and others can be used for the same purpose in certain cases.

Examples of aldehyde-mixed phenols condensation products of the kind involved herein and the methods and steps for making them are given below for the purpose of disclosing how the present invention can be used.

*Example 1.*—Eighty-seven pounds of 92% phenol (carbolic acid), sixty-eight pounds of commercial formaldehyde solution (37.5% solution) and 1330 cubic centimeters of a solution of ammonia in water (26°, sp. gr. 0.90, 27 to 28% by weight) are heated under a reflux condenser for about one hour after which eighty pounds of cashew nut shell liquid (from which the naturally occurring metals have been removed by, for example, the method disclosed in Patent Number 2,067,919), twenty-one pounds, five ounces of formaldehyde solution (same as above) and four hundred and eighteen cubic centimeters of ammonia solution (same as above) are added and heating under the reflux is continued for one-half hour after which the water is removed at 150° F. under vacuum.

The resin produced by these steps is soluble, warm or cold, in alcohol or toluol and in other solvents.

For making laminations the resin of Example 1, above, (and of the other examples hereinafter given) can be applied by means of a solvent to the surface of sheets or rolls of paper, cloth or other material and the solvent driven off, for example at about 200° F. to about 225° F., during which heating the resin condenses further to a stage in which it is insoluble in alcohol but is fusible. The coated material is then built up in layer to the desired thickness and pressed at a temperature of about 300° F. to about 350° F., for example, to set or condense the resin further to the ultimate or other predetermined degree at which it is infusible.

In the following further examples the phenol (carbolic acid), the formaldehyde, the ammonia solution and the cashew nut shell liquid are of the specifications set forth in Example 1 above, to which reference is hereby made.

*Example 2.*—Twenty-two pounds of carbolic acid, twenty pounds of cardanol (described in Patent Number 2,098,824, to which reference is hereby made), twenty-four pounds of formaldehyde and one-thousand one hundred cubic centimeters of ammonia solution and heated under the reflux condenser for about two hours and then dehydrated at reduced pressure. This resin is soluble at this stage in alcohol and in toluol and upon further heating passes through a stage in which it is insoluble in alcohol (or toluol) but is fusible and then passes to the infusible stage.

*Example 3.*—Eighty-seven pounds of phenol (carbolic acid), forty pounds of cardanol, seventy-eight pounds of formaldehyde and fifteen hundred and forty pounds of ammonia solution are heated under the reflux condenser for about two hours after which forty pounds of cashew nut shell liquid, eleven pounds of formaldehyde and two hundred and ten cubic centimeters of ammonia solution are added and the heating under reflux continued for about a half-hour after which the resin is dehydrated at about 150° F. under vacuum.

It is to be noted that for the purpose of the present invention in those cases in which cashew nut shell liquid is used it is advantageous to start the aldehyde condensation of the phenol (carbolic acid), and of the cardanol when used, before aldehyde condensation of the cashew nut shell liquid is commenced because the latter condenses so quickly with an aldehyde (or other reactive methylene containing material) that it will go over to a stage in which it is too heavy or viscous and difficultly soluble before the phenol (or cardanol) is sufficiently reacted with the aldehyde.

The proportions given in the examples above are given as examples, but variations can be made within certain ranges to suit various conditions such as thickness of the fibrous material to be laminated or the closeness or looseness of the fibers therein and to suit other conditions. It can be generally stated that for every mole of phenol (carbolic acid), or its equivalent such as one of the cresols or the xylenols, from about 0.16 mole to about 0.7 mole of cashew nut shell liquid or cardanol or other phenol having an unsaturated hydrocarbon substituent can be used, and that for every mole of a phenol of whatever kind used from about 0.6 mole to about 1.5 moles of formaldehyde (HCHO) or its equivalent can be used.

The laminated material or stock of the present invention is suitable for making electrical insulating parts; for making pulleys and gears for machinery; for making abrasive wheels or discs by laminating sheets or discs of cloth, paper or other material carrying abrasive material such as sand, carborundum and other granular material or one or both sides of surfaces of the solvent sheets or discs; for example friction elements such as brake and clutch linings, for example, with the use of laminations of asbestos sheets or plates, with or without other materials; and the laminated material of the present invention is suitable for use in the arts generally.

Laminated stock or material made according to the present invention is resistant to chlorine, alkalis and other chemicals and is resistant to moisture.

Having thus described my invention, what I claim and desire to protect by Letters Patent is:

1. A laminated product characterized by the fact that it can be punched at a high rate of speed at normal temperatures without delamination, comprising essentially sheets of cellulosic fibrous material bound together by a condensation product of formaldehyde and a mixture of carbolic acid and cardanol, the amount of said formaldehyde reacted being from about 0.6 mole to about 1.5 moles for each mole of the phenols reacted therewith, the ratio of said carbolic acid to cardanol in said mixture being about 1 mole to about 0.16 mole to 0.7 mole, said condensation product being thermosetting.

2. A laminated product characterized by the fact that it can be punched at a high rate of speed at normal temperatures without delamination, comprising essentially sheets of cellulosic fibrous material bound together by a condensation product of formaldehyde and a mixture of carbolic acid cashew nut shell liquid and cardanol, the amount of said formaldehyde reacted being from about 0.6 mole to about 1.5 moles for each mole of the phenols reacted therewith, the ratio of said carbolic acid to cardanol and cashew nut shell liquid in said mixture being about 1 mole to about 0.16 mole to 0.7 mole, said condensation product being thermosetting.

MORTIMER T. HARVEY.